Sept. 4, 1928.  1,683,245
W. J. GOLIGHTLY
APPARATUS FOR FORMING AND HANDLING CLAY POTS
Filed April 18, 1922   3 Sheets-Sheet 1
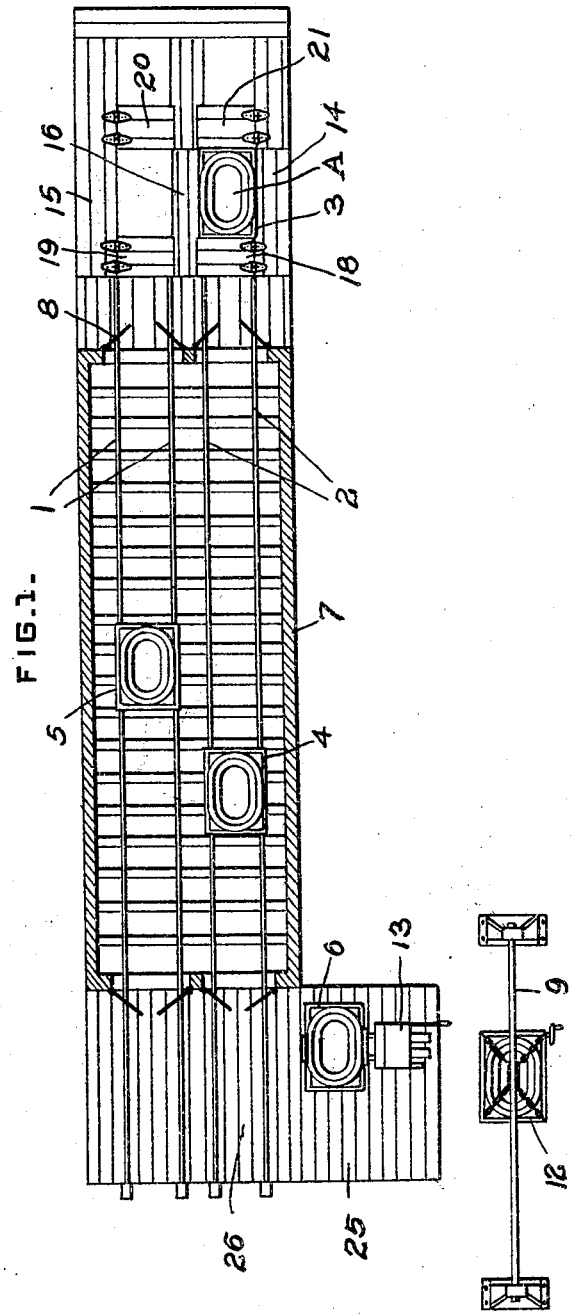
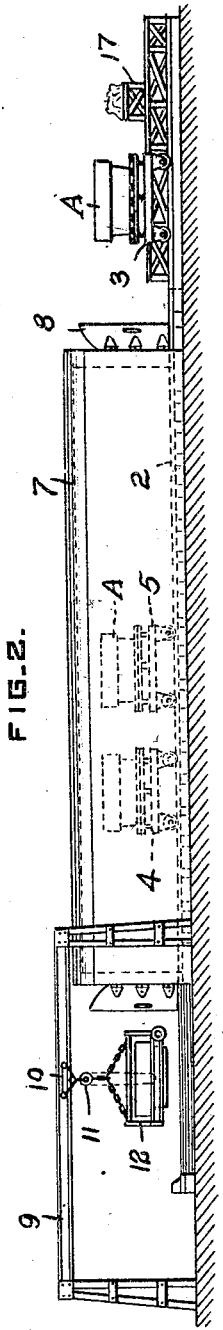

Sept. 4, 1928.  1,683,245
W. J. GOLIGHTLY
APPARATUS FOR FORMING AND HANDLING CLAY POTS
Filed April 18, 1922    3 Sheets-Sheet 2
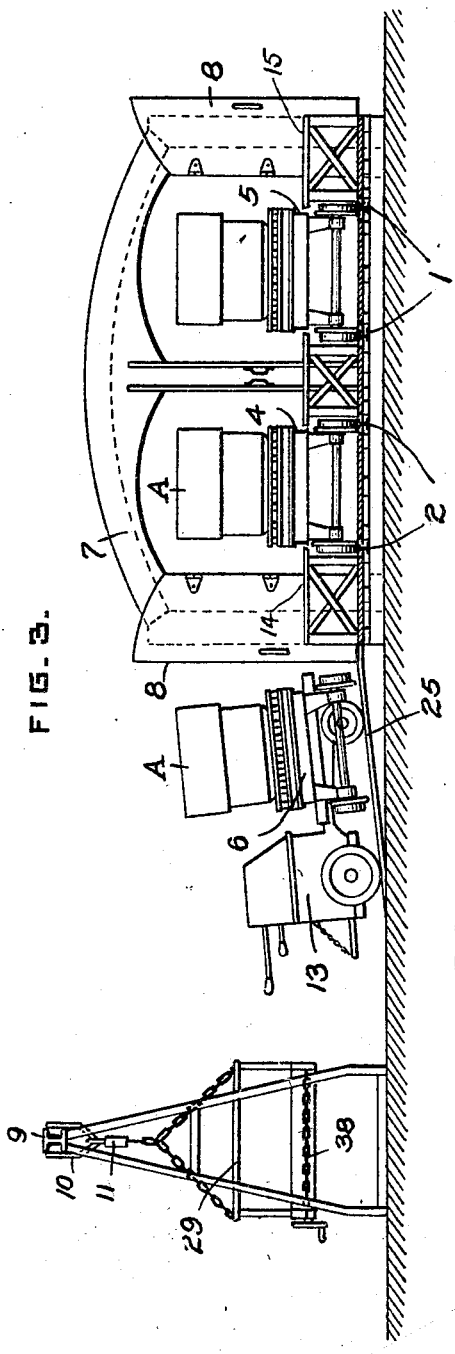
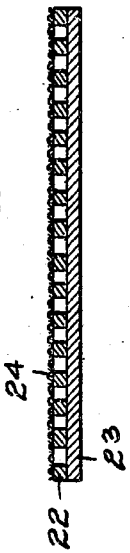
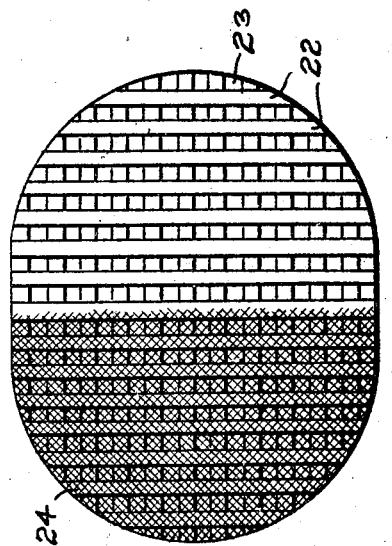
INVENTOR
Wm J. Golightly
by
James C. Bradley
atty Sept. 4, 1928.  W. J. GOLIGHTLY  1,683,245
APPARATUS FOR FORMING AND HANDLING CLAY POTS
Filed April 18, 1922   3 Sheets-Sheet 3
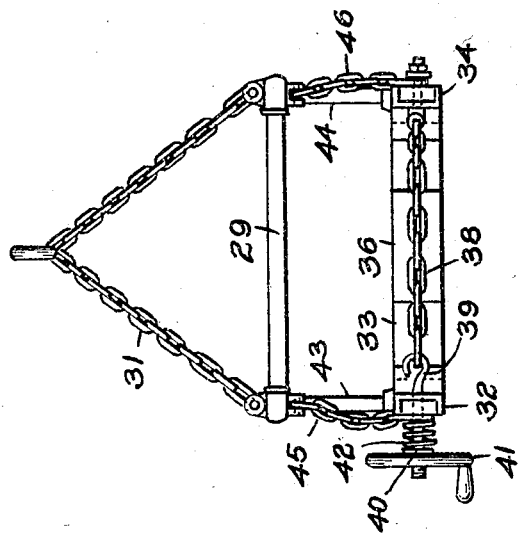
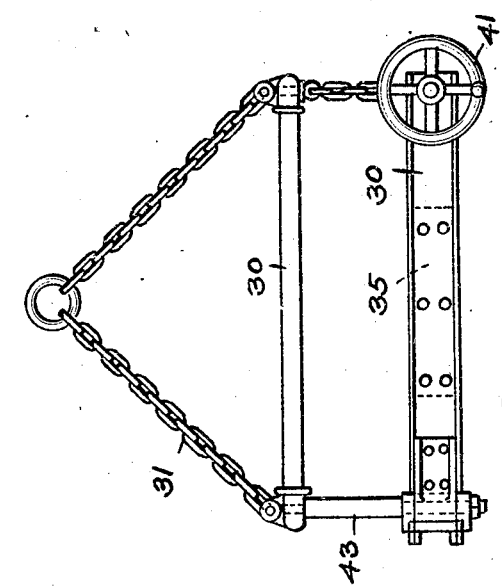
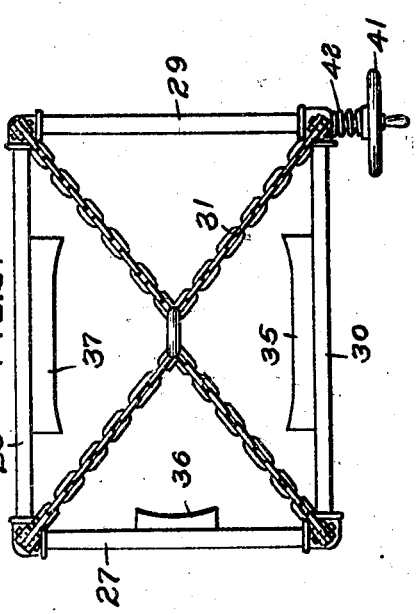
INVENTOR Patented Sept. 4, 1928.

1,683,245

UNITED STATES PATENT OFFICE.

WILLIAM J. GOLIGHTLY, OF KOKOMO, INDIANA, ASSIGNOR TO PITTSBURGH PLATE GLASS COMPANY, A CORPORATION OF PENNSYLVANIA.

APPARATUS FOR FORMING AND HANDLING CLAY POTS.

Application filed April 18, 1922. Serial No. 555,267.

The invention relates to an apparatus for forming and drying clay pots, such as those employed in the manufacture of glass, and preliminary to the arching of such pots. The invention has for its principal object the provision of an improved apparatus, whereby the pots may be conveniently fabricated upon the trucks which are employed in the drying operation, and in which the labor of handling the pots is reduced to a minimum. One form of apparatus for carrying out the method involved is illustrated in the accompanying drawings wherein:

Figure 1 is a partial plan and partial sectional view of the apparatus. Fig. 2 is a side elevation. Fig. 3 is an elevation looking from the right to the left of the construction of Fig. 1. Figs. 4 and 5 are detailed views of the mold board preferably employed, Fig. 4 being a plan view and Fig. 5 a section. Figs. 6, 7 and 8 are detailed views of the transfer carriage.

In carrying out the operation, the pots A are built upon trucks and these trucks are carried on tracks through drying compartments or chambers, during which time the pots are dried out preparatory to firing or arching. When a truck emerges from the drying room, it is lifted bodily from the tracks by means of a transfer car and carried laterally beneath a transfer crane, which crane engages the pot and supports it in suspended position. The transfer car then returns the truck to starting position, after which it returns to a position beneath the transfer crane, where it receives the suspended pot and carries it to the arching position.

In order that the workmen may conveniently build or fabricate the pots on the trucks, working platforms are provided alongside the trucks at a level adjacent the floors of such trucks. Removable platform sections are also provided at the ends of the trucks for bridging the spaces over the tracks, so that the workmen may stand at a convenient level while working at the ends of the truck.

Referring to the drawings, 1 and 2 are tracks adapted to carry the trucks 3, 4, 5 and 6, it being understood that as many trucks may be used as is found convenient or desirable. 7 is a drying tunnel or chamber provided at the ends with the swinging doors 8. The details of construction of this drying tunnel or chamber constitute no part of the present invention and such chamber is illustrated in a diagrammatic way only. In practice, this tunnel or chamber is preferably divided into compartments provided with suitable heating means and humidity controlling devices, and is of such length that the pots are properly dried during their passage therethrough in a given period which is dependent upon the length of the chamber and the speed of movement of the pots therethrough. Adjacent the outlet end of the drying chamber at one side thereof is the overhead track 9 upon which is mounted a crane comprising a trolley 10 carrying a lifting tackle 11, upon which is supported the transfer device 12 for removing the pots from the trucks and holding them suspended after the drying operation.

13 is one of the transfer cars employed for removing the trucks from the tracks 1 and 2 after the drying operation and after the pots are removed therefrom and carrying them back to starting position at the inlet end of the drying chamber. The transfer cars preferably employed are known as "Elwell-Parker trucks", although any type of transfer mechanism for accomplishing this function may be employed. These cars are electrically operated and have their platforms relatively low, so that they may be readily passed beneath the body portions of the pot trucks. The platforms have suitable elevating mechanism, so that after they are inserted beneath the trucks, they may be raised sufficiently to lift the pot trucks from their tracks.

Adjacent the entrance end of the drying chamber are the platform sections 14, 15 and 16 extending along the sides of the tracks 1 and 2 (Fig. 1) and located at an elevation only slightly below that of the top of the trucks, as indicated in Figs. 2 and 3. The clay to be employed in the fabrication of the pots is placed upon these platforms, either on the floor itself or upon suitable tables 17 (Fig. 2). Other platform sections 18, 19, 20 and 21 are also employed opposite the ends of the trucks, such sections bridging the spaces over the tracks, so that the workmen can stand at the ends of the pots as well as at the sides. These platform sections are hinged as indicated in Fig. 1, so that they may be swung out of the way to permit the trucks to move along the tracks before and after the fabrication of the pots. The platforms are at a level which is most convenient for the workmen in building the pots, i. e., ordinarily somewhat below the level of the floors of the trucks, as indicated in Figs. 2 and 3.

The pots are preferably mounted upon mold boards constructed as indicated in Figs. 4 and 5 and comprising two sets of transverse spaced bars 22 and 23 covered with a galvanized steel wire fabric 24. This construction is desirable, as it permits of the ready access of air to the bottom of the pot during the drying operation, so that the drying of this bottom portion will progress more rapidly than if a solid mold board were used.

In operation, the trucks for carrying the pots are brought to the position of the truck 3, as indicated in Fig. 1, and the hinged platforms are positioned as illustrated, so that a complete platform is provided entirely around the car. The pot is then built up or fabricated on the truck in the usual way. When this operation is completed, the hinged platforms are swung up and the truck is moved into the drying chamber. As new pots are fabricated and placed in the chamber, the series of pots are moved ahead step by step, and as heretofore pointed out the period of time which the pots are allowed to remain in the chamber is such that by the time the pots reach the outlet end, they are thoroughly dried and ready for arching or furnacing. When the pot truck emerges from the drying chamber at the left-hand end thereof, the transfer car 13 is moved laterally, so that its platform passes beneath the body of the truck on the track. This movement of the transfer car to position is facilitated by the use of inclined platform or ramp 25 (Figs. 1 and 3), which leads up to the level of the floor 26 at the end of the drying chamber. This floor 26 is at the level of the tops of the rails constituting the tracks 1 and 2, so that the transfer car may be moved across the tracks without interference from the rails.

After the transfer car is positioned with its platform beneath the body of the pot truck, the platform is elevated to lift the pot truck off of its track and the transfer car is withdrawn laterally down the inclined platform 25 to a position beneath the lifting crane on the overhead beam 9. This overhead crane is designed to lift the pot from its truck and hold it suspended while the transfer car is returning the pot truck to the right-hand end of the tracks 1 or 2. The lifting frame is preferably constructed as indicated in detail in Figs. 6, 7 and 8, although any other form of lifting device may be employed at this point. This device comprises an upper pipe framework made up of the four members 27, 28, 29 and 30 supported from the chains 31, and the bottom frame consisting of three channel members 32, 33 and 34 provided with the inwardly projecting members 35, 36 and 37 for engaging the pot beneath its shoulder. The other side of this frame is open to permit the device to be slipped over the pot from the side, and a closing means for this open end is provided in the form of a chain 38 secured at one end to the end of the channel 34 (Fig. 7) and adapted at its other end to be secured to the hook 39 extending through the channel 32. This hook is screw threaded and carries the hand-wheel 41 provided with the hub 40, which serves to close the frame after it has been positioned over the pot. A spring 42 is provided between the hub 40 and the channel 32, so that any pressure applied to the pot due to the operation of the wheel is a yielding one, avoiding the danger of inadvertently squeezing the pot too hard. The lower frame is supported from the pipe frame by means of the two pipe members 43 and 44 and the chain members 45 and 46.

After the transfer car has carried the pot truck back to the inlet end of the drying chamber, it is returned to position beneath the suspended pot which is then lowered onto the car and released from the supporting frame. The pot is then carried by the car to the arching furnace. In this way, the one transfer car is utilized for carrying both trucks and the pots and the amount of transfer equipment is reduced to a minimum. Other means might, however, be employed for handling the trucks and pots after they emerge from the drying chamber, the invention not being limited to the arrangement illustrated and described for returning the trucks to starting position and for transferring the pots to the arching furnace, although this arrangement is preferred because of its simplicity and ease of operation.

The building of the clay articles upon the mold boards from which they are not removed during their transportation through the drying room or passage is of particular advantage in the fabrication of large clay pots or other articles requiring strength and durability, as this method of handling avoids the imposition of strains upon the articles liable to produce cracks and other defects therein, some of which would only show up in service, and thus involve a considerable loss.

What I claim is:

Apparatus for building and drying pots comprising a working platform, a drying room, a track extending through the platform and through the drying room, a series of trucks mounted on the track with their tops adjacent the level of the platform, and movable floor sections for bridging the spaces in the platform at the ends of the trucks.

In testimony whereof, I have hereunto subscribed my name this 25 day of March, 1922.

WILLIAM J. GOLIGHTLY.